(12) United States Patent
Mori

(10) Patent No.: US 8,886,264 B2
(45) Date of Patent: Nov. 11, 2014

(54) PORTABLE ELECTRONIC APPARATUS

(75) Inventor: Takahiro Mori, Yokohama (JP)

(73) Assignee: Kyocera Corporation, Kyoto (JP)

( * ) Notice: Subject to any disclaimer, the term of this patent is extended or adjusted under 35 U.S.C. 154(b) by 270 days.

(21) Appl. No.: 13/335,021

(22) Filed: Dec. 22, 2011

(65) Prior Publication Data

US 2012/0162082 A1    Jun. 28, 2012

(30) Foreign Application Priority Data

Dec. 24, 2010 (JP) ................................. 2010-288280

(51) Int. Cl.
| | | |
|---|---|---|
| H04M 1/00 | (2006.01) | |
| H04B 1/38 | (2006.01) | |
| G06F 3/02 | (2006.01) | |
| G09G 5/00 | (2006.01) | |
| G06F 1/16 | (2006.01) | |

(52) U.S. Cl.
CPC ............ G06F 1/1618 (2013.01); G06F 1/1662 (2013.01); G06F 1/1681 (2013.01); G06F 1/1643 (2013.01); G06F 1/1649 (2013.01)
USPC .................. 455/575.4; 455/556.1; 455/556.2; 455/566; 345/168; 345/169; 361/679.3; 361/679.56

(58) Field of Classification Search
USPC .................. 345/168, 169; 361/679.3, 679.56; 455/556.1, 556.2, 566, 575.4
See application file for complete search history.

(56) References Cited

U.S. PATENT DOCUMENTS

| | | | | |
|---|---|---|---|---|
| 2005/0202840 A1* | 9/2005 | Kespohl et al. | ............ | 455/550.1 |
| 2005/0245313 A1* | 11/2005 | Yoshino et al. | ................. | 463/30 |
| 2007/0005161 A1* | 1/2007 | Henson et al. | .................. | 700/94 |
| 2010/0188350 A1* | 7/2010 | Sawada | .......................... | 345/173 |
| 2011/0009169 A1* | 1/2011 | Kim | .............................. | 455/566 |

FOREIGN PATENT DOCUMENTS

| | | | |
|---|---|---|---|
| JP | 2009071588 A | | 4/2009 |
| JP | 2009-222556 | * | 10/2010 |
| KR | 2002078295 A | * | 10/2002 |

OTHER PUBLICATIONS

Klug, Brian. Blackberry Torch 9800 Review. AnandTech. Sep. 1, 2010. <http://www.anandtech.com/show/3880/blackberry-torch-9800-review-keeping-rims-flame-alive/5> Accessed Nov. 4, 2013.*

* cited by examiner

*Primary Examiner* — Dwayne Bost
*Assistant Examiner* — Stefan M Oehrlein
(74) *Attorney, Agent, or Firm* — Lowe Hauptman & Ham, LLP

(57) ABSTRACT

According to an aspect, a portable electronic apparatus includes a first housing, a second housing, a touch panel, a display, a connection mechanism, an operation unit, and a control unit. The touch panel is arranged in a first surface of the first housing. The display is arranged in a second surface of the second housing. The connection mechanism connects the first housing and the second housing so as to switch between a closed state where the first housing covers the display and the touch panel is exposed to the outside and an opened state where the touch panel and the display are exposed to the outside while being adjacent to each other. The operation unit is arranged on the second surface at a position adjacent to the display. The control unit controls an operation of each unit.

10 Claims, 14 Drawing Sheets

PORTABLE ELECTRONIC APPARATUS

This application claims priority from Japanese Application No. 2010-288280, filed on Dec. 24, 2010, the content of which is incorporated by reference herein in its entirety.

BACKGROUND OF THE INVENTION

1. Technical Field

The present disclosure relates to a portable electronic apparatus which includes a display for displaying an image.

2. Description of the Related Art

Recently, various kinds of shapes and structures of housing have been proposed in connection with a portable electronic apparatus including a display such as a mobile phone, a personal digital assistant (PDA), and a portable game machine. For example, Japanese Patent Application Laid-Open No. 2009-71588 discloses a portable communication terminal which includes a first housing and a second housing that are connected to each other. In the portable communication terminal, the surface of the first housing is provided with a first display, and the surface of the second housing is provided with the second display. Further, a second input touch panel is provided to cover at least part of the surface of the second display. The first housing and the second housing are configured so as to move relatively to each other between a closed position at which the rear surface of the second housing overlaps the surface of the first housing, and an opened position at which the surfaces of the first and second displays are arranged on the same plane to be adjacent to each other.

The above-discussed portable communication terminal is configured such that only the display of the first housing is exposed in a closed state (closed position) and both of the displays of the first and second housings are exposed on the same plane in an opened state (opened position). Therefore, the portable communication terminal can be used in a different way according to the applications, and the apparatus can provide a large screen formed with the first display and the second display.

In the above-discussed portable communication terminal, screens of two housings are connected so as to be used as one large screen. Since each screen overlaps almost the entire surface of the housing, some users may find it difficult to hold the terminal with user's hands while using the terminal. Moreover, some users may feel hard to input letters with the touch panel. For the foregoing reasons, there is a need for a portable electronic apparatus advantageous in operability and convenient to be held by hand.

SUMMARY OF THE INVENTION

According to an aspect, a portable electronic apparatus includes a first housing, a second housing, a touch panel, a display, a connection mechanism, an operation unit, and a control unit. The touch panel is arranged in a first surface of the first housing. The display is arranged in a second surface of the second housing. The connection mechanism connects the first housing and the second housing so as to switch between a closed state where the first housing covers the display and the touch panel is exposed to the outside and an opened state where the touch panel and the display are exposed to the outside while being adjacent to each other. The operation unit is arranged on the second surface at a position adjacent to the display. The control unit controls an operation of each unit.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used as an example of the mobile electronic apparatus, however, the present invention is not limited to mobile phones. Therefore, the present invention can be applied to any type of devices provided with a touch panel, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
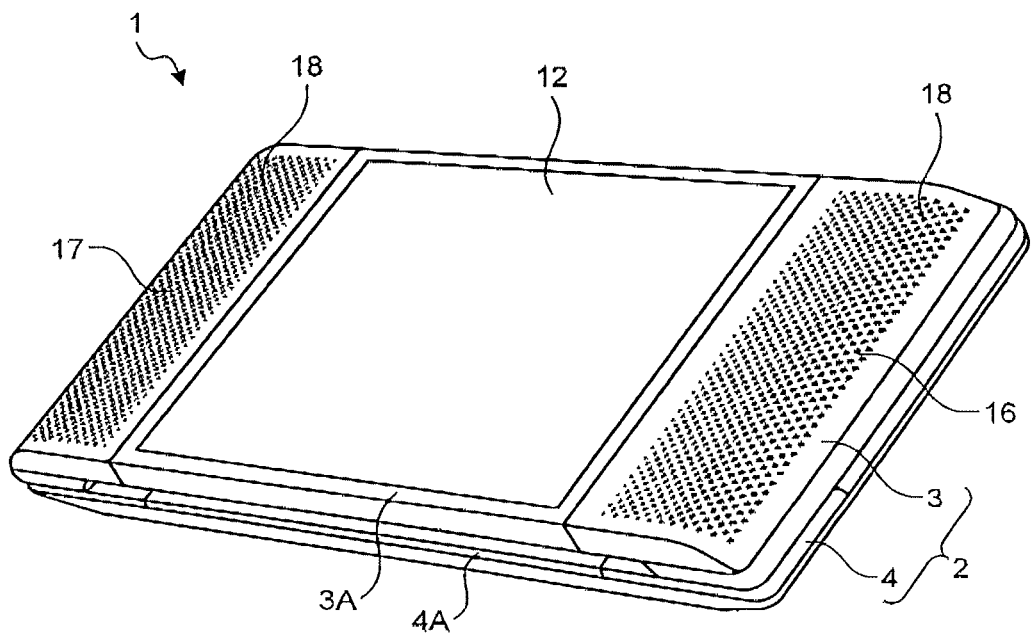
FIG. 1 is a perspective view illustrating a portable electronic apparatus according to an embodiment.
Figure 2:
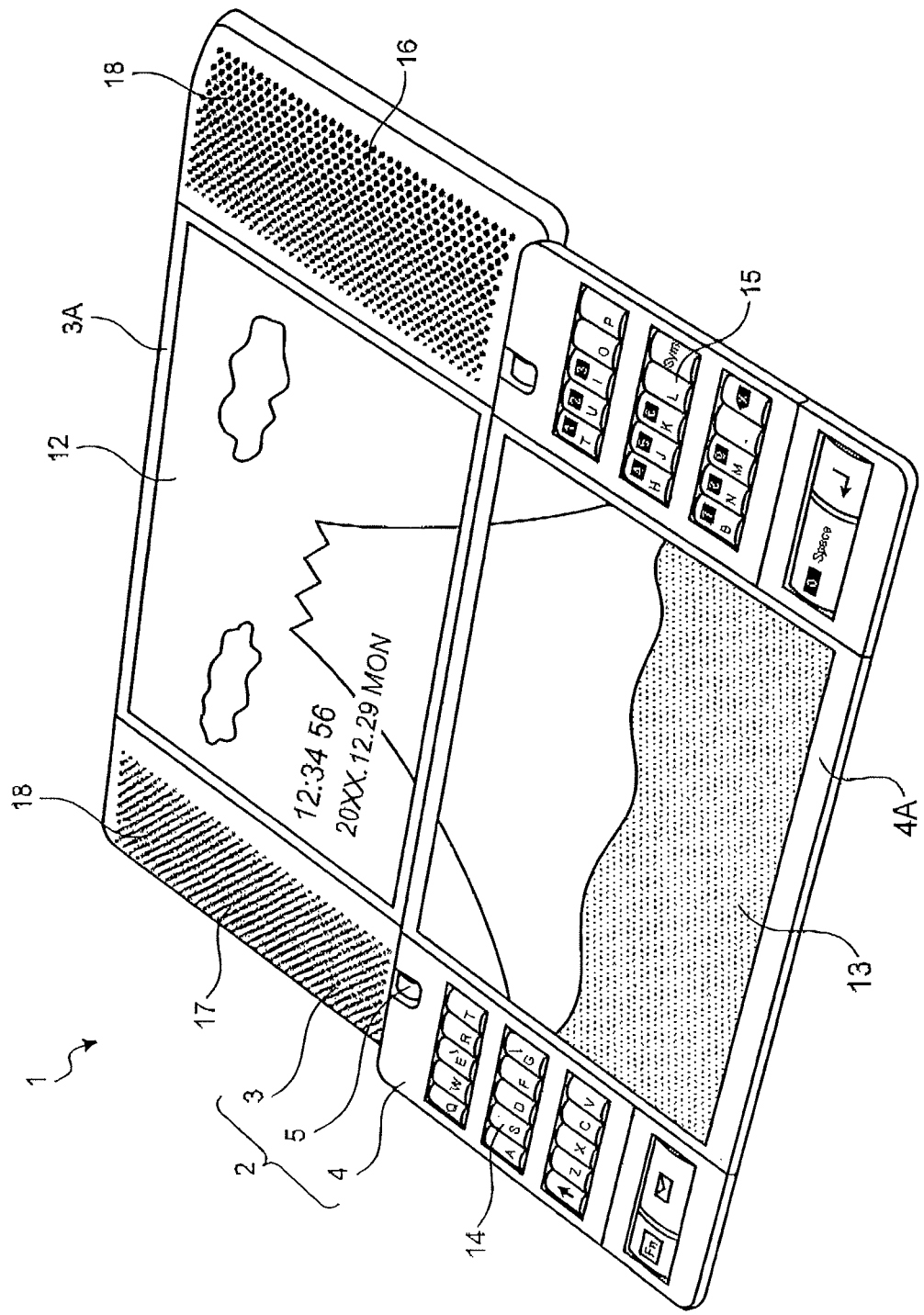
FIG. 2 is a perspective view illustrating the portable electronic apparatus illustrated in FIG. 1 in another state.
Figure 3:
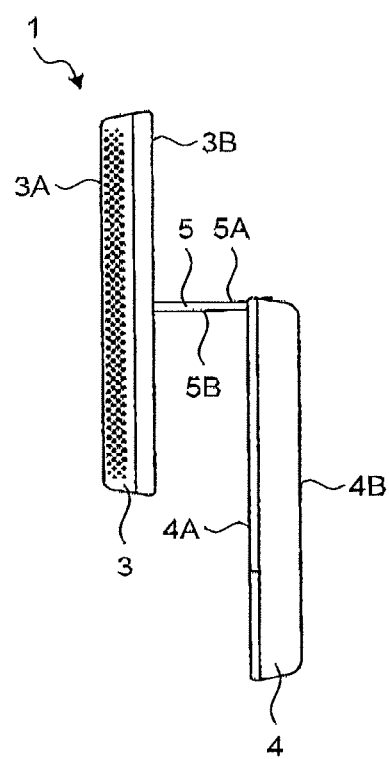
FIG. 3 is a side view illustrating the short side surface of the portable electronic apparatus illustrated in FIG. 1 in the middle of an open/close operation.
Figure 4A:
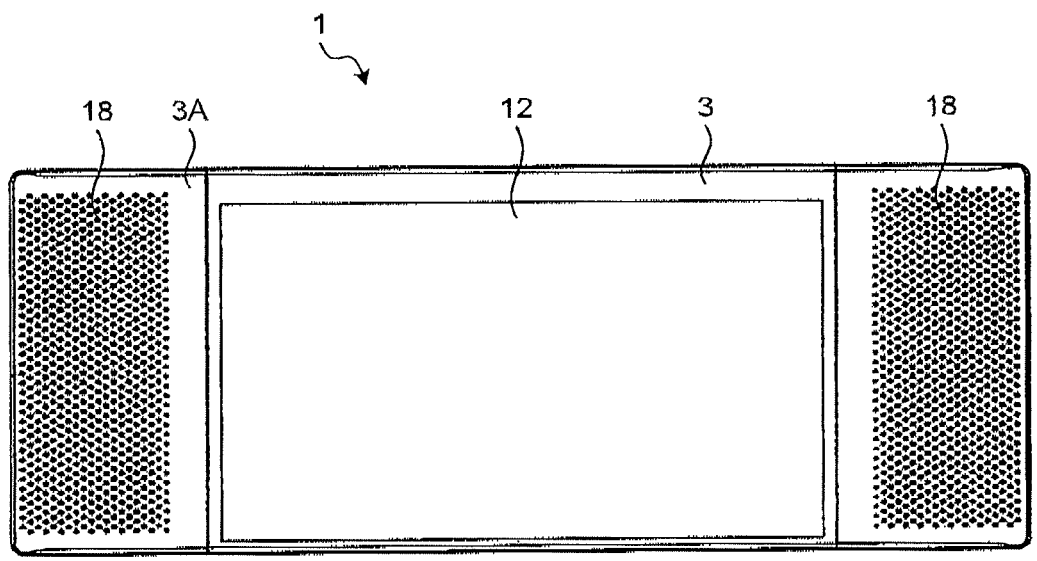
FIG. 4A is a front view illustrating the portable electronic apparatus illustrated in FIG. 1.
Figure 4B:
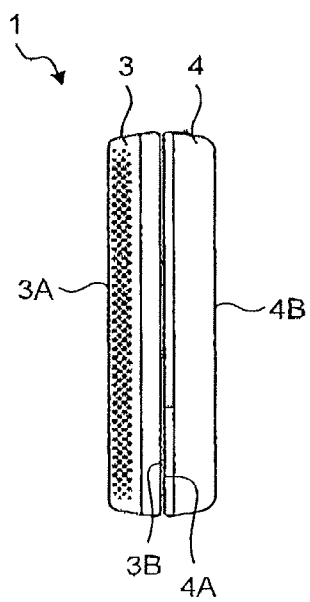
FIG. 4B is a side view illustrating the short side surface of the portable electronic apparatus illustrated in FIG. 1.
Figure 4C:
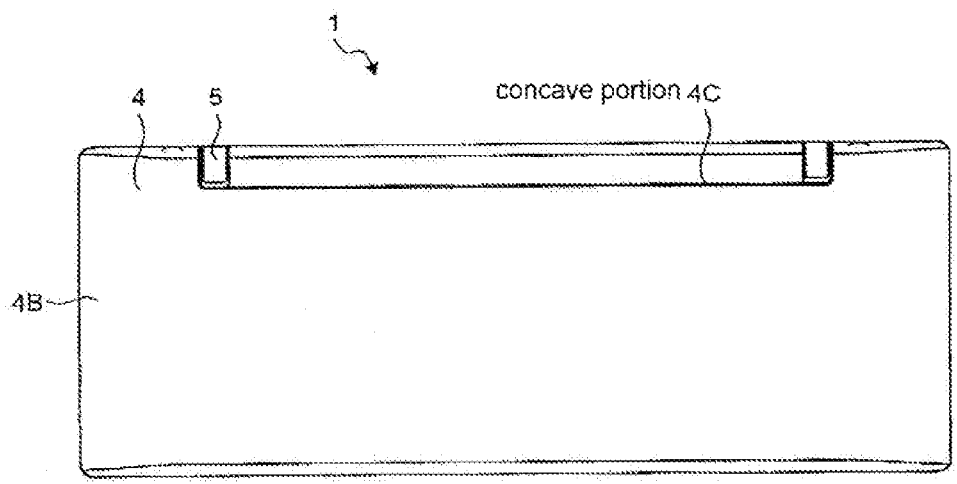
FIG. 4C is a rear view illustrating the portable electronic apparatus illustrated in FIG. 1.
Figure 4D:
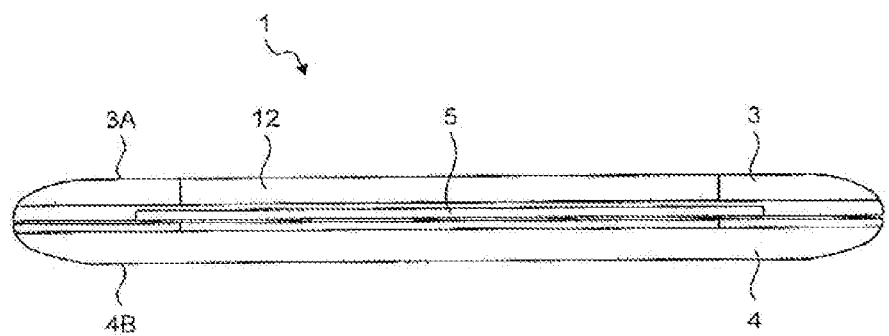
FIG. 4D is a side view illustrating the long side surface of the portable electronic apparatus illustrated in FIG. 1.
Figure 5A:
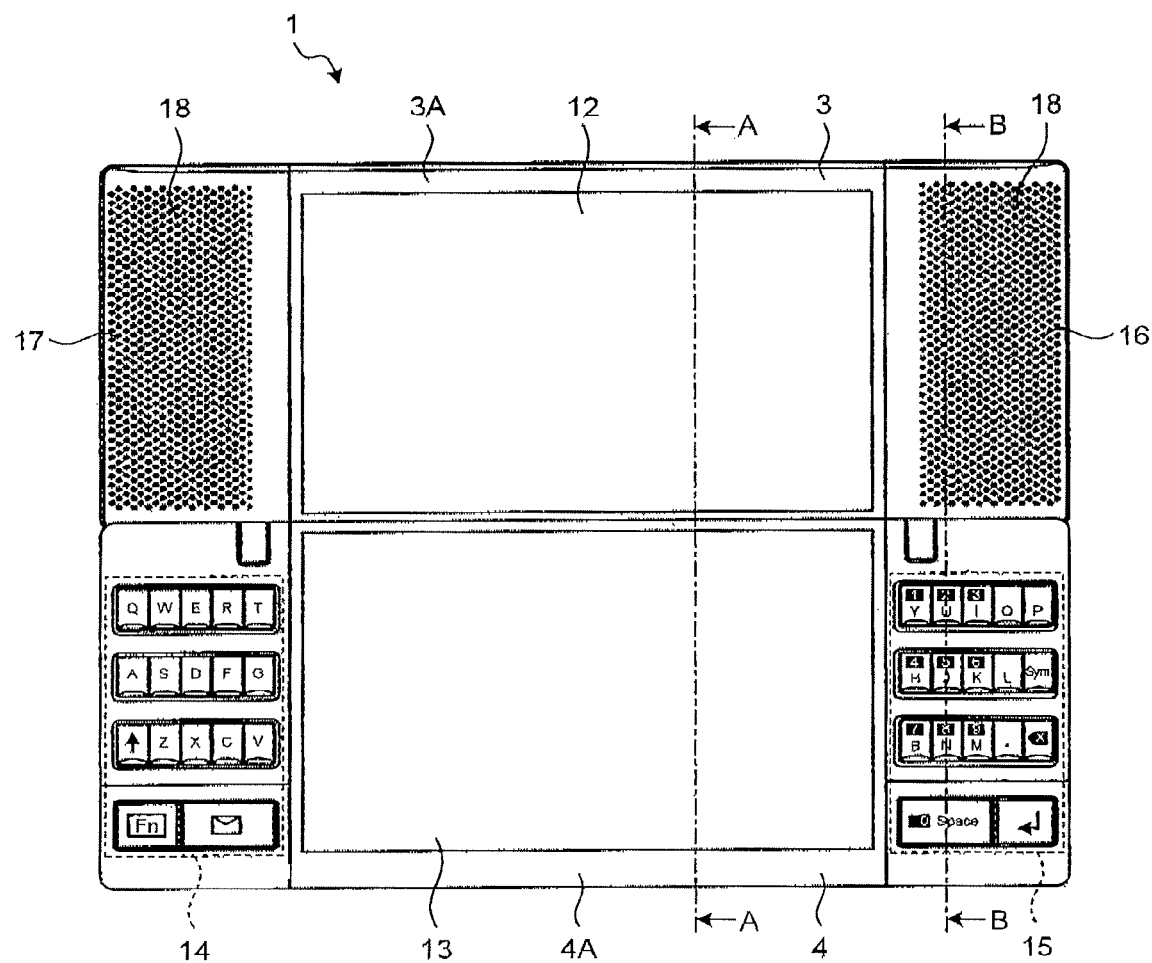
FIG. 5A is a front view illustrating the portable electronic apparatus illustrated in FIG. 2.
Figure 5B:
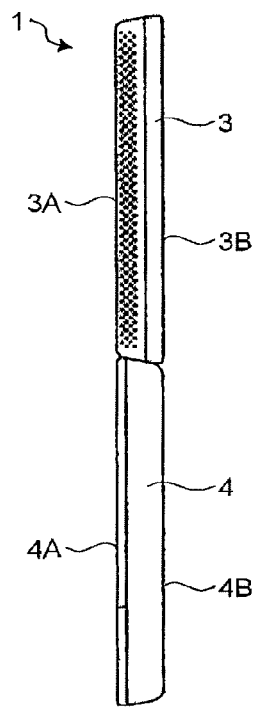
FIG. 5B is a side view illustrating the short side surface of the portable electronic apparatus illustrated in FIG. 2.
Figure 5C:
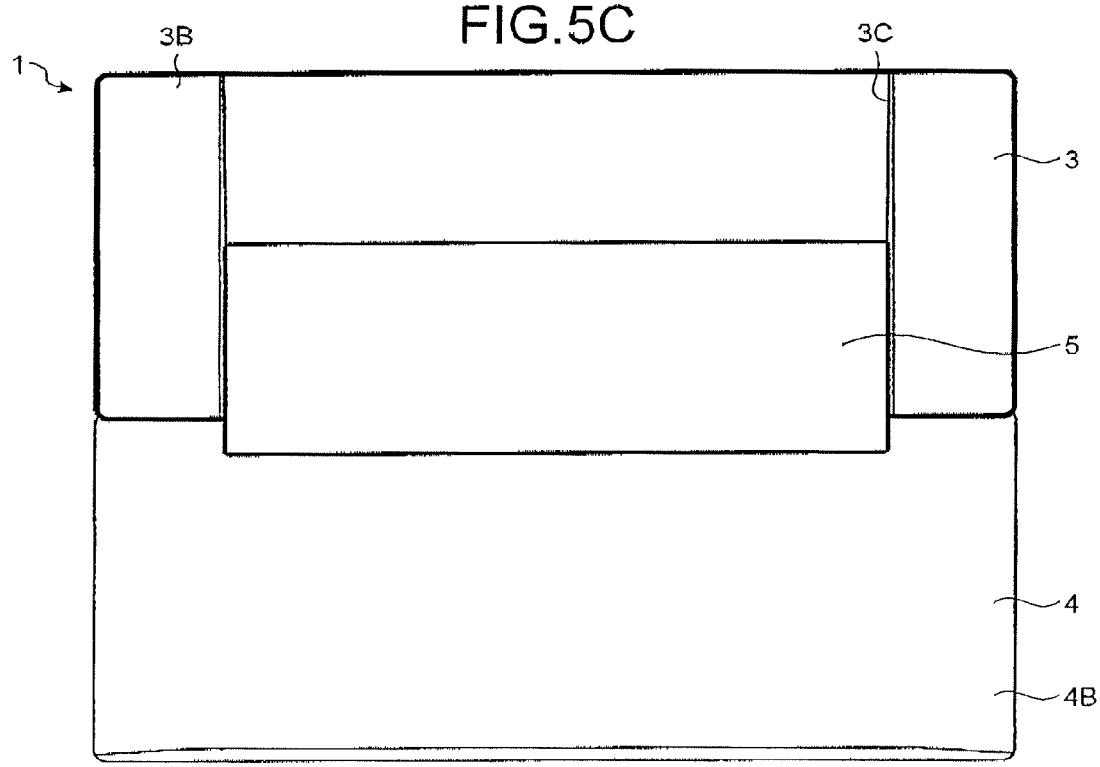
FIG. 5C is a rear view illustrating the portable electronic apparatus illustrated in FIG. 2.
Figure 6A:
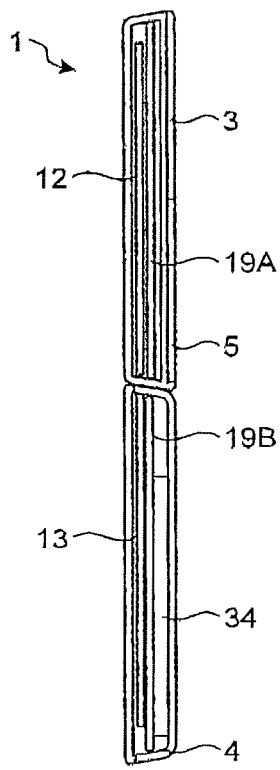
FIG. 6A is a cross-sectional view illustrating the portable electronic apparatus taken along the line A-A of FIG. 5A.
Figure 6B:
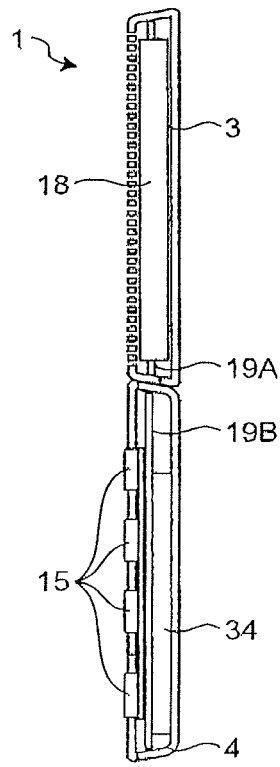
FIG. 6B is a cross-sectional view illustrating the portable electronic apparatus taken along the line B-B of FIG. 5A.

First, an overall configuration of a portable electronic apparatus 1 will be described with reference to FIGS. 1 to 6B. FIG. 1 is a perspective view illustrating the portable electronic apparatus according to an embodiment. FIG. 2 is a perspective view illustrating the portable electronic apparatus illustrated in FIG. 1 in another state. FIG. 3 is a side view illustrating the short side surface of the portable electronic apparatus illustrated in FIG. 1 in the middle of an open/close operation. FIG. 4A is a front view illustrating the portable electronic apparatus illustrated in FIG. 1, FIG. 4B is a side view illustrating the short side surface of the portable electronic apparatus illustrated in FIG. 1, FIG. 4C is a rear view illustrating the portable electronic apparatus illustrated in FIG. 1, and FIG. 4D is a side view illustrating the long side surface of the portable electronic apparatus illustrated in FIG. 1. FIG. 5A is a front view illustrating the portable electronic apparatus illustrated in FIG. 2, FIG. 5B is a side view illustrating the short side surface of the portable electronic apparatus illustrated in FIG. 2, FIG. SC is a rear view illustrating the portable electronic apparatus illustrated in FIG. 2. FIG. 6A is a cross-sectional view illustrating the portable electronic apparatus taken along the line A-A of FIG. 5A, and FIG. 6B is a cross-sectional view illustrating the portable electronic apparatus taken along the line B-B of FIG. 5A.

The portable electronic apparatus 1, as illustrated in FIGS. 1 to 3, is configured with a housing 2 which includes a first housing 3, a second housing 4, and a connection mechanism 5. FIG. 1 illustrates the portable electronic apparatus 1 in a first state (a closed state), and FIG. 2 illustrates the portable electronic apparatus 1 in a second state (an opened state). FIG. 3 illustrates the portable electronic apparatus 1 in an intermediate state between the first state and the second state.

The first housing 3 has an elongated plate shape, that is, a long rectangular shape with a certain thickness. The second housing 4 also has an elongated plate shape, that is, a long rectangular shape with a certain thickness. In the following, one of the largest surfaces (the long rectangular surfaces) among the surfaces of the first housing 3 is assumed as the front surface 3A and the other one is assumed as the rear surface 3B of the first housing 3. Among the surfaces of the first housing 3, the surfaces (which are present between the front surface and the rear surface) that provide the certain thickness are assumed as the side surfaces of the first housing 3. One of the largest surfaces (the long rectangular surfaces) among the surfaces of the second housing 4 is assumed as the front surface 4A and the other one is assumed as the rear surface 4B of the second housing 4. Among the surfaces of the second housing 4, the surfaces (which are present between the front surface and the rear surface) that provide the certain thickness are assumed as the side surfaces of the second housing 4. Herein, as illustrated in FIG. 1, the first housing 3 and the second housing 4 are configured such that, in the first state, the rear surface 3B of the first housing 3 faces the front surface 4A of the second housing 4 and, in the second state, the front surface 3A of the first housing 3 and the front surface 4A of the second housing 4 are exposed to the outside in the same direction. The rear surface 3B of the first housing 3 is substantially the same size as the front surface 4A of the second housing 4.

The connection mechanism 5 connects the first housing 3 and the second housing 4 in a relatively movable manner. The connection mechanism 5, as illustrated in FIG. 3, is a plate-shaped member, in which one end is connected to the near center of the rear surface 3B of the first housing 3 in the lateral direction, and the other end is connected to the end portion of the front surface 4A of the second housing 4 in the lateral direction. The connection mechanism 5 is connected to connection portions of the first and second housings 3 and 4 in such a manner that the connection portions are rotatable around axes which are parallel to a vertical direction (the longitudinal direction of the front surface 3A of the first housing 3) with respect to the paper plane of FIG. 3.

In the first state, where the rear surface 3B of the first housing 3 overlaps the front surface 4A of the second housing 4 as illustrated in FIG. 1, a first surface 5A of the plate-shaped member illustrated in FIG. 3 faces the rear surface 3B of the first housing 3 and a second surface 5B opposite to the first surface 5A faces the front surface 4A of the second housing 4. In the second state, where one of side surfaces of the first housing 3 faces one of the side surfaces of the second housing 4 as illustrated in FIG. 2, the second surface 5B of the plate-shaped member illustrated in FIG. 3 faces the rear surface 3B of the first housing 3. In the second state, the first surface 5A is exposed to the outside. In other words, the connection mechanism 5 switches between the first state and the second state by the turning of the plate members by 180 degrees about any one of the connection portions.

As illustrated in FIGS. 1 and 4A to 4D, in the first state, the rear surface 3B of the first housing 3 faces the front surface 4A of the second housing 4, and the front surface 4A of the second housing 4 is covered with the rear surface 3B of the first housing 3. Thus, in the first state, the front surface 3A of the first housing 3, the rear surface 4B of the second housing 4, the side surface of the first housing 3, and the side surface of the second housing 4 are exposed to the outside. In addition, the connection mechanism 5 is interposed between the rear surface 3B of the first housing 3 and the front surface 4A of the second housing 4, so that the connection mechanism S is substantially hidden therebetween. Thus, in the closed state, the rear surface 3B of the first housing 3 faces the front surface 4A of the second housing 4, so that the both surfaces overlap each other. The second housing 4 includes a concave portion 4C in which the second housing 4 is connected to the side surface of the connection mechanism 5. Therefore, the connection portion between the connection mechanism 5 and the second housing 4 is exposed to the outside as illustrated in FIG. 4C.

As illustrated in FIGS. 2 and 5A to 5C, in the second state, one of the side surfaces of the first housing 3 in the longitudinal direction faces one of the side surfaces of the second housing 4 which is in the longitudinal direction and connected to the connection mechanism 5. The front surface 3A of the first housing 3 is arranged substantially on the same plane with respect to the front surface 4A of the second housing 4 in the same direction. Further, the rear surface 3B of the first housing 3 is arranged almost on the same plane with respect to the rear surface 4B of the second housing 4 facing in the same direction. Thus, in the second state, the front and rear surfaces 3A and 3B of the first housing 3 and the front and rear surfaces 4A and 4B of the second housing 4 are exposed to the outside. In addition, the connection mechanism 5 is exposed to the outside in the rear surface 3B of the first housing 3.

As illustrated in FIGS. 1 to 5C, the concave portion 3C is formed in the rear surface 3B of the first housing 3. The connection mechanism 5 is accommodated in the concave portion 3C even in either the first or second state. For this reason, in the second state as illustrated in FIG. 5B, the connection mechanism 5 is not invisible from the side in the lateral direction. In addition, since the connection mechanism 5 is accommodated in the concave portion 3C, the areas other than the concave portion 3C in the rear surface 3B of the first housing 3 can be brought into close proximity to the front surface 4A of the second housing 4 in the first state.

Next, each unit which is provided in the first housing 3 and the second housing 4 of the portable electronic apparatus 1 will be described with reference to FIGS. 1 to 5C. The following description will be made mainly with reference to FIGS. 2 and 5A. The front surface 3A of the first housing 3 includes a first touch panel 12, a microphone 16, a receiver 11, and two speakers 18. The first touch panel 12 is formed in a rectangular shape in which the short side is in the lateral direction of the front surface 3A and the long side is in the longitudinal direction of the front surface 3A. The first touch panel 12 is arranged over almost the entire area of the front surface 3A in the lateral direction, partially dominating a certain area around the center portion in the longitudinal direction. The microphone 16 is arranged at one of the ends of the front surface 3A in the longitudinal direction. The receiver 17 is arranged at the one end of the front surface 3A in the longitudinal direction. The two speakers 18 are respectively arranged at both ends of the front surface 3A in the longitudinal direction. In other words, one speaker 18 is arranged in the same area as the microphone 16 adjacent to the one short side of the first touch panel 12, and the other speaker 18 is arranged in the same area as the receiver 17 adjacent to the other short side of the first touch panel 12.

The front surface 4A of the second housing 4 includes a second touch panel 13, a first operation section 14, and a second operation section 15. The second touch panel 13 is formed in a rectangular shape in which the short side is in the lateral direction of the front surface 4A and the long side is in the longitudinal direction of the front surface 4A. The second touch panel 13 is arranged over almost the entire area of the front surface 4A in the lateral direction, partially dominating a certain area around the center portion in the longitudinal direction. The first operation section 14 is arranged adjacent to one end portion of the front surface 4A in the longitudinal direction, that is, one short side of the second touch panel 13. The second operation, section 15 is arranged adjacent to the other end portion of the front surface 4A in the longitudinal direction, that is, the other short side of the second touch panel 13.

The first and second touch panels 12 and 13 display characters, figures, images, and the like, and also detect various kinds of operations (gestures) on the touch panel performed by a user using a finger or a stylus (in the description herein below, for the sake of simplicity, it is assumed that the user touches the first and second touch panels 12 and 13 with his/her fingers). In other words, the first and second touch panels 12 and 13 have two functionalities; one of which is to display images (the function as a display) and the other one of which is to detect operations (the function as an operation unit).

The first and second operation sections 14 and 15 are keyboards, each having a plurality of keys (physical keys) thereon. The first and second operation sections 14 and 15 form a keyboard having a QWERTY layout by combining keys in both units. In other words, the first and second operation sections 14 and 15 are formed by dividing the QWERTY keyboard into two parts: one part serves as a keyboard for the first operation section 14; and the other part serves as a keyboard for the second operation section 15. The first operation section 14 is provided with a function key. Part of keys arranged in the QWERTY layout for the second operation section 15 is assigned as a 10-key numeric keypad.

The microphone 16 serves to receive voice during a call through the portable electronic apparatus 1. The receiver 17 and the two speakers 18 output voice or sound during a call, reproducing movie, playing music, and the like. In this embodiment, since the two speakers 18 are arranged at both ends of the first touch panel 12, a stereo sound may be output.

Next, the internal structure of the portable electronic apparatus 1 will be described with reference to FIGS. 6A and 6B.

As illustrated in FIGS. 6A and 6B, the first housing 3 includes the first touch panel 12, the speaker 18, and a circuit board 19A therein. While not illustrated in FIGS. 6A and 6B, the first housing 3 further includes the microphone 16 and the receiver 17 therein. The second housing 4 includes the second touch panel 13, the second operation section 15, the circuit board 19B, and a battery 34 therein. While not illustrated in FIGS. 6A and 6B, the second housing 4 further includes the first operation section 14 therein.

The circuit boards 19A and 19B are boards which are provided with electronic components having functioning as a control unit 22 and a storage unit 24, for example, a central processing unit (CPU) and memory to be described below. The circuit boards 19A and 19B are arranged closer to the rear surfaces 3B and 4B rather than the first touch panel 12 and the second touch panel 13, respectively. The battery 34 is arranged closer to the rear surface 4B rather than a touch panel 13 and the second operation section 14 of the second housing 4.

Figure 7:
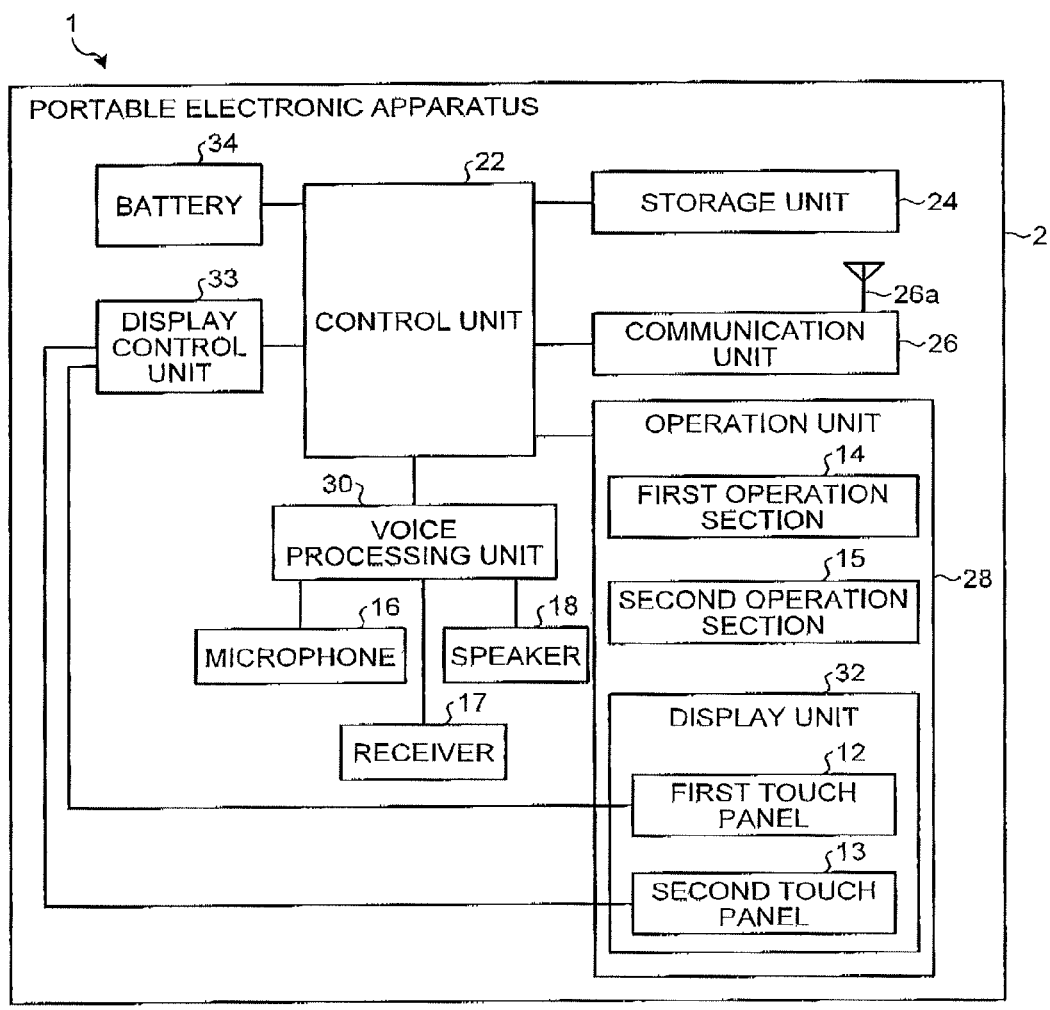
FIG. 7 is a block diagram schematically illustrating the configuration of the portable electronic apparatus.

Next, the relation between the functions of the portable electronic apparatus 1 and the control unit will be described. FIG. 7 is a block diagram illustrating the configuration of the portable electronic apparatus illustrated in FIG. 1. As illustrated in FIG. 7, the portable electronic apparatus 1 includes the control unit 22, the storage unit 24, a communication unit 26, an operation unit 28, a voice processing unit 30, a display unit 32, a display control unit 33, and the battery 34. The portable electronic apparatus 1 further includes the microphone 16, the receiver 17, and the speaker 18, which are connected to the voice processing unit 30.

The control unit 22 is a processing unit for controlling integrally the overall operation of the portable electronic apparatus 1, for example, it is a central processing unit (CPU). That is, the control unit 22 controls the operations of the communication unit 26, the display unit 32, and the like so that various kinds of processes performed by the portable electronic apparatus 1 may be executed according to the operations of the operation unit 28 or the procedure of the software stored in the storage unit 24 of the portable electronic apparatus 1. The control unit 22 performs processes on the basis of program(s) (for example, an operating system program, an application program, and the like) stored in the storage unit 24.

The storage unit 24 stores software or data for the processes performed in the control unit 22. For example, the storage unit 24 stores a program for performing control on an image to be displayed in the display unit 32 and a program for transmitting and receiving an email. Furthermore, the storage unit 24 stores various kinds of data as well as the programs. For example, various kinds of setting conditions, an address book, dictionary data used for converting characters, movie data to be displayed in the display unit 32, and the like are stored in the storage unit 24.

The communication unit 26 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The operation unit 28 includes the first touch panel 12, the second touch panel 13, the first operation section 14, and the second operation section 15. When a user operates the touch panels or the operation sections to input data, the operation unit 28 sends details of the operation to the control unit 22.

The voice processing unit 30 processes a voice signal which is input to the microphone 16 or a voice signal which is to be output from the receiver 17 and the speaker 18.

The display unit 32, as described above, includes the first touch panel 12 and the second touch panel 13. The first touch panel 12 and the second touch panel 13 of the display unit 32 display a video corresponding to video data and an image corresponding to the image data supplied through the display control unit 33 from the control unit 22 on a display device. The battery 34 is a power source which supplies power to each unit of the portable electronic apparatus 1, such as the control unit 22.

The portable electronic apparatus 1 is configured as described above. In the first state (the closed state), the first touch panel 12 is exposed to the outside, and the second touch panel 13, the first operation section 14, and the second operation section 15 are covered with the first housing 3. In the second state (the opened state), the first touch panel 12, the second touch panel 13, the first operation section 14, and the second operation section 15 are exposed to the outside.

The first state is a state suitable for a user to carry the portable electronic apparatus 1 with him/her. Even in this state, the user can refer to information which is displayed on the first touch panel 12, and operate the first touch panel 12 with a finger to input information. The second state is a state suitable for the user to use the portable electronic apparatus 1. In this state, the user can refer to much information by using the first touch panel 12 and the second touch panel 13 in combination.

In addition, since the portable electronic apparatus 1 includes the first operation section 14 and the second operation section 15 at both ends of the second touch panel 13, in the opened state, the user grips the areas where the first operation section 14 and the second operation section 15 are arranged so as to hold the housing 2. In this way, the user can easily hold the housing 2 without making contact with the first touch panel 12 and the second touch panel 13. In addition, since an operation can be input through the first operation section 14 and the second operation section 15, some areas in the front surface 4A can be effectively used which may have been covered when the user grasps the portable electronic apparatus 1.

In addition, the portable electronic apparatus 1 includes the first operation section 14 and the second operation section 15 which are provided with keys arranged in the QWERTY layout, so that the characters can be input without displaying a user interface such as a virtual keyboard for inputting the characters in the first touch panel 12 or the second touch panel 13. Therefore, the display area of the first touch panel 12 and the second touch panel 13 can be effectively used. In addition, since the input operation by using the physical keys such as the first operation section 14 and the second operation section 15 is detected, a false detection in the input operation can be reduced compared with a case where the touch panel is used. Therefore, it is possible to operate the portable electronic apparatus 1 in a speedier manner.

Figure 8:
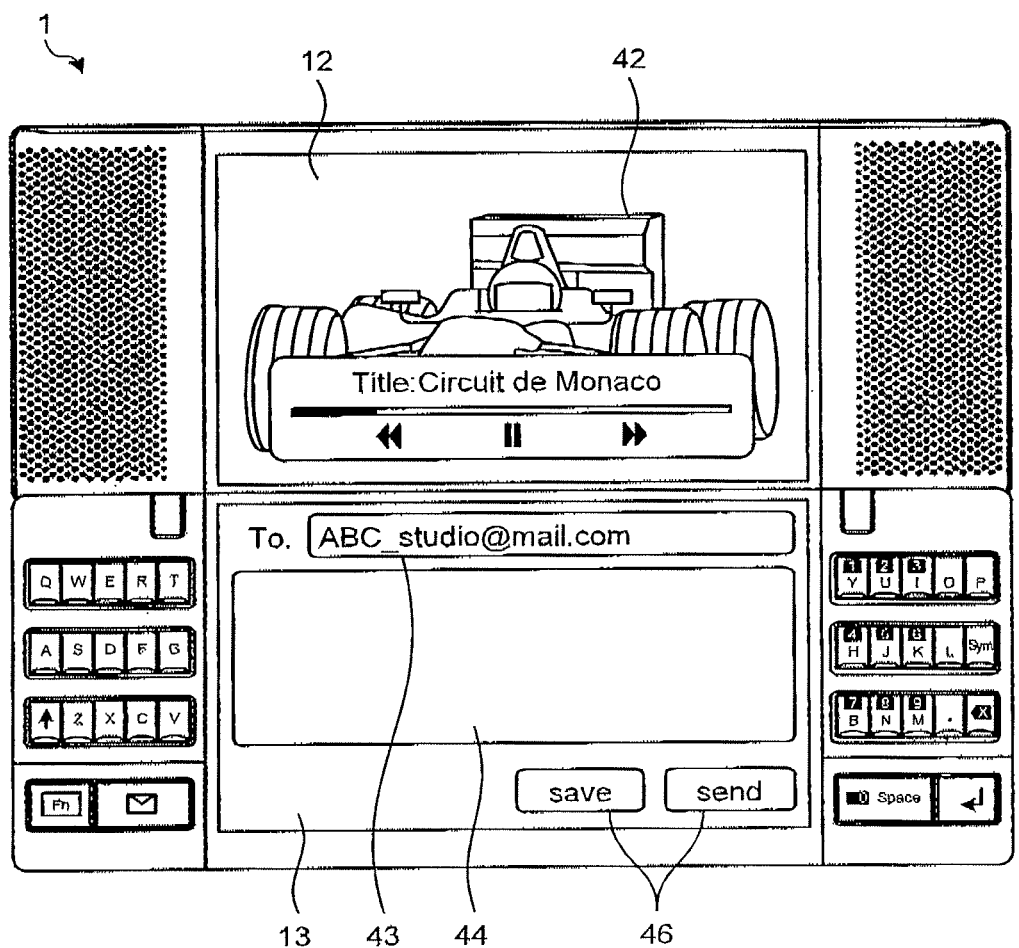
FIG. 8 is a diagram illustrating an example of an image which is displayed in a display.
Figure 9:
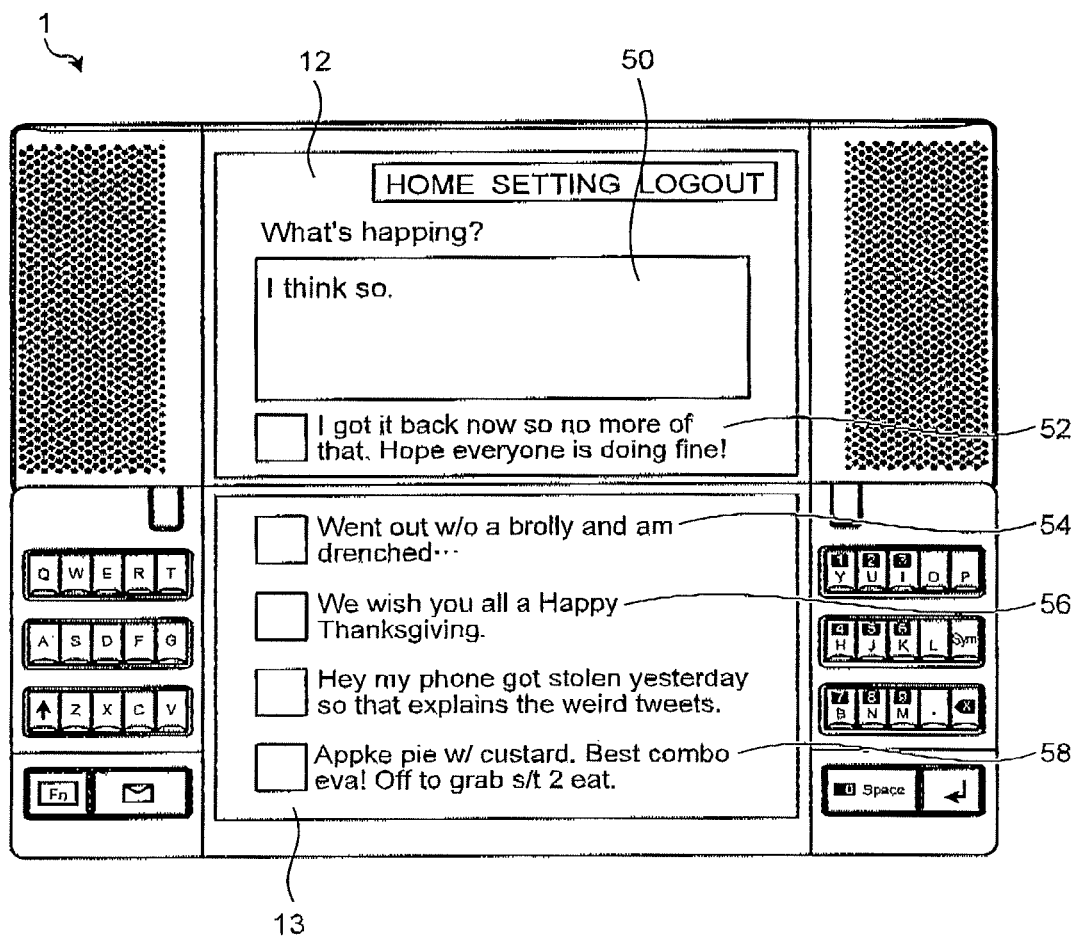
FIG. 9 is a diagram illustrating an example of contents displayed in the displays.

FIGS. 8 and 9 are diagrams illustrating an example of contents displayed in the displays. For example, as illustrated in FIG. 8, the portable electronic apparatus 1 displays an item 43, a character input field 44, and buttons 46 on the second touch panel 13, and receives the input of the characters while displaying an image 42 on the first touch panel 12. Thus, while reproducing a video as the image 42 in the first touch panel 12, it is possible to display an email composing screen using the second touch panel 13. In this case, the characters can be input using the first operation section 14 and the second operation section 15. Therefore, it is possible to display necessary information other then the virtual keyboard in a magnified manner on the first touch panel 12 and the second touch panel 13.

The user of the portable electronic apparatus 1 can input, for example, characters while using the first touch panel 12 and the second touch panel 13 as a large-scale screen as illustrated in FIG. 9. FIG. 9 illustrates a state in which a character input screen 50 and a comment 52 are displayed on the first touch panel 12, and comments 54, 56, and 58 are displayed on the second touch panel 13. The character input screen 50, the comment 52, and the comments 54, 56, and 58 may be one screen which is obtained from a Web page or the like. As described above, even when the first touch panel 12 and the second touch panel 13 are used in large-scale screen, there is no need to display an operation input screen such as the virtual keyboard. Therefore, it is possible to display much information on the first touch panel 12 and the second touch panel 13.

The portable electronic apparatus 1 includes the first operation section 14 and the second operation section 15 at the both ends of the second touch panel 13, respectively. Thus, the operation unit configured with the physical keys is divided into two parts, so that it is possible to perform an input operation using the keys with both hands. In other words, while the user is holding both ends of the second housing 4 in the longitudinal direction, the user can operate the first operation section 14 using the left hand (mainly, the thumb of the left hand), and the second operation section 15 using the right hand (mainly, the thumb of the right hand). In this way, the both hands may be used for the input operation, so that the operation (for example, the character input operation) can be made at high speed. Since the user may operate the portable electronic apparatus 1 while holding the housing 2 with both hands, it is possible to hold it in a balanced manner. In addition, it is possible to prevent the concentration of the load on one hand.

The keys arranged in the QWERTY layout are used as the first operation section 14 and the second operation section 15, so that it is possible to input the characters in a simple manner as described above. Since the first operation section 14 and the second operation section 15 constitute the keys arranged in the QWERTY layout which are divided into two parts, the user can input the characters using the same input mechanism as a typical keyboard with which the user has become habituated to character input as usual. The keys arranged in the QWERTY layout can be divided into two parts with interposition of a border; one for the right hand and one fox the left hand to input characters. Thus, if a keyboard is divided into two parts along the boundary, the user can operate each key by using his/her hand as usual.

The layout of keys used for the first and second operation sections 14 and 15 is not limited to the QWERTY layout. For example, the first operation section 14 and the second operation section 15 may include a key for a letter which is not included in the QWERTY keyboard, and thus the virtual keyboard for inputting the letter can be eliminated from the screen. For example, a keyboard layout in which vowel keys and consonant keys are arranged apart may be used For example, the first and second operation sections 14 and 15 may be configured only with a 10-key numeric keypad and/or a direction keypad. The first and second operation sections 14 and 15 may include a structure other than the operation unit which detects pressing as an operation, for example, a pointer device such as a click ball. The operation unit may be provided on any one side.

The portable electronic apparatus 1 is configured such that a function key is provided in the first operation section 14 and the 10-key numeric keypad is allocated to a part of the keys arranged in the QWERTY layout on the second operation section 15. Therefore, at the time of inputting numeric data, the user can enter a number by pressing the number-allocated key with the right hand while pressing the function key with the left hand. Since there is no need to provide keys for the 10-key numeric keypad, it is possible to reduce the number of keys which are provided in the first operation section 14 and the second operation section 15. Since the keys for allocating the function key and the 10-key numeric keypad are separately provided in the operation unit, the numeric data can be continuously input with one hand while pressing the function key with the other hand. Thus, the user can easily input the numeric data. According to the present embodiment, the function key is provided in the first operation section 14, and the 10-key numeric keypad is allocated on a part of the second operation section 15 arranged in the QWERTY layout. However, a key to which a mode switching function is allocated for the input of the numeric data may be provided in either the first operation section 14 or the second operation section 15, and on the other section, the keys to which the 10-key input (numeric data input) may be allocated when the mode is activated.

The portable electronic apparatus 1 is configured such that the speakers 18 are arranged in the areas overlapping the first operation section 14 and the second operation section 15 in the closed state. Therefore, the first touch panel 12 and the second touch panel 13 are formed to have the same size in the longitudinal direction of the front surfaces 3A and 4A in the opened state. Thus, it is possible to efficiently use the space. With this configuration, it is possible to improve the design of the portable electronic apparatus 1 in the opened state.

In a case where at least one of the first operation section 14 and the second operation section 15 is operated, the portable electronic apparatus 1 may make an operation sound through the speaker 18 which overlaps the operated operation section in the closed state. Specifically, when the first operation section 14 is operated, the speaker 18 (the speaker 18 which overlaps the first operation section 14 in the closed state) adjacent to the first operation section 14 may make an operation sound. when the second operation section 15 is operated, the speaker 18 (the speaker 18 which overlaps the second operation section 15 in the closed state) adjacent to the second operation section 15 may make an operation sound. With this configuration, the user can understand the input operation in a more intuitive way.

The first operation section 14 and the second operation section 15 may respectively include backlight units for emitting light to a plurality of keys from the rear surface. In this case, when the input to the first operation section 14 is effective, the control unit 22 may make a control such that the backlight unit provided in the first operation section 14 emits light to the plurality of keys of the first operation section 14. Further, when the input to the second operation section 15 is effective, the control unit 22 may make a control such that the backlight unit provided in the second operation section 15 emits light to the plurality of keys of the second operation section 15. With this configuration, the user may easily see the keys that are effectively used for the input operation.

Figure 10:
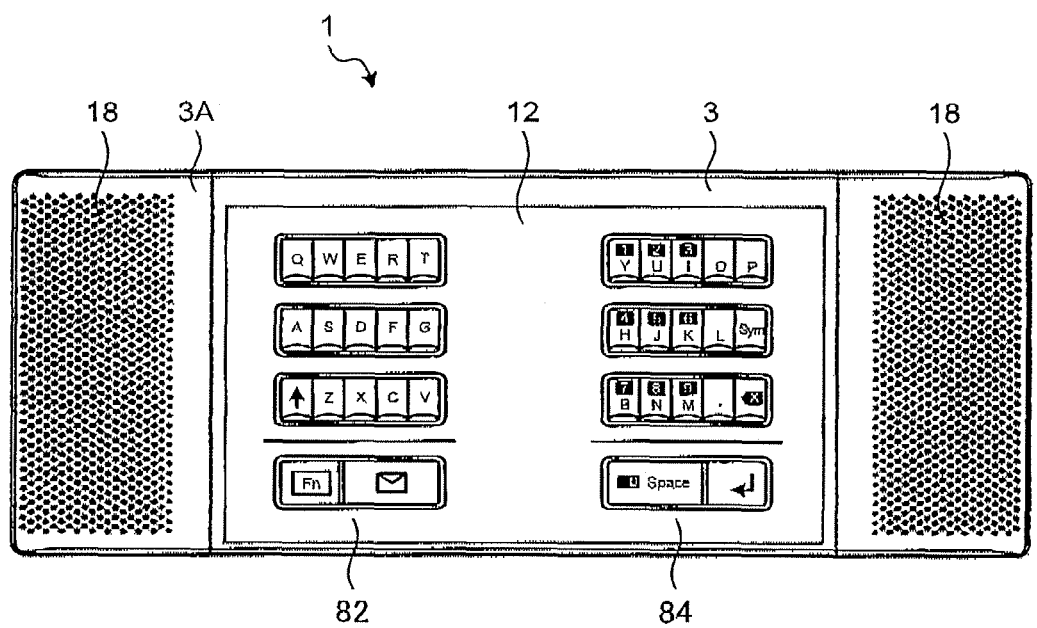
FIG. 10 is a diagram illustrating an example of contents displayed in the displays.

When an input operation on the first touch panel 12 is detected in the closed state, the control unit 22 may make a control of displaying the images of the first operation section 14 and the second operation section 15 on the first touch panel 12. FIG. 10 is a diagram illustrating an example of the image which is displayed in the display. In other words, as illustrated in FIG. 10, a key group 82 of the plurality of keys of the first operation section 14 and a key group 84 of the plurality of keys of the second operation section 15 may be displayed in the first touch panel 12. When a key belonging to the key group 82 or the key group 84 is touched, the control unit 22 detects the touched key as an input. In this way, when an input operation on the first touch panel 12 is detected in the closed state, the same operation unit images as those of the first operation section 14 and the second operation section 15 (that is, the operation units other then the hidden touch panels) may be displayed. With this configuration, it is possible to perform an input operation in the closed state and in the opened state with the same operational feeling, and the same input operation may be performed in the closed state and the opened state.

As described in the present embodiment, the housing 2 is configured such that the side surface of the first housing 3 faces the side surface of the second housing 4 at a given inclination angle in the opened state. In this way, since the side surfaces are made as inclined surfaces, it is possible that the first housing 3 and the second housing 4 are prevented from rotating around a rotation axis parallel to the longitudinal direction in the opened state. In addition, as described in the present embodiment, the first touch panel 12 and the second touch panel 13 are arranged such that the end portions of the front surface 3A and the front surface 4A go to substantially the same position in the longitudinal direction. With this structure, in the opened state, it is possible to make the first touch panel 12 and the second touch panel 13 more visible as one large screen.

Figure 11:
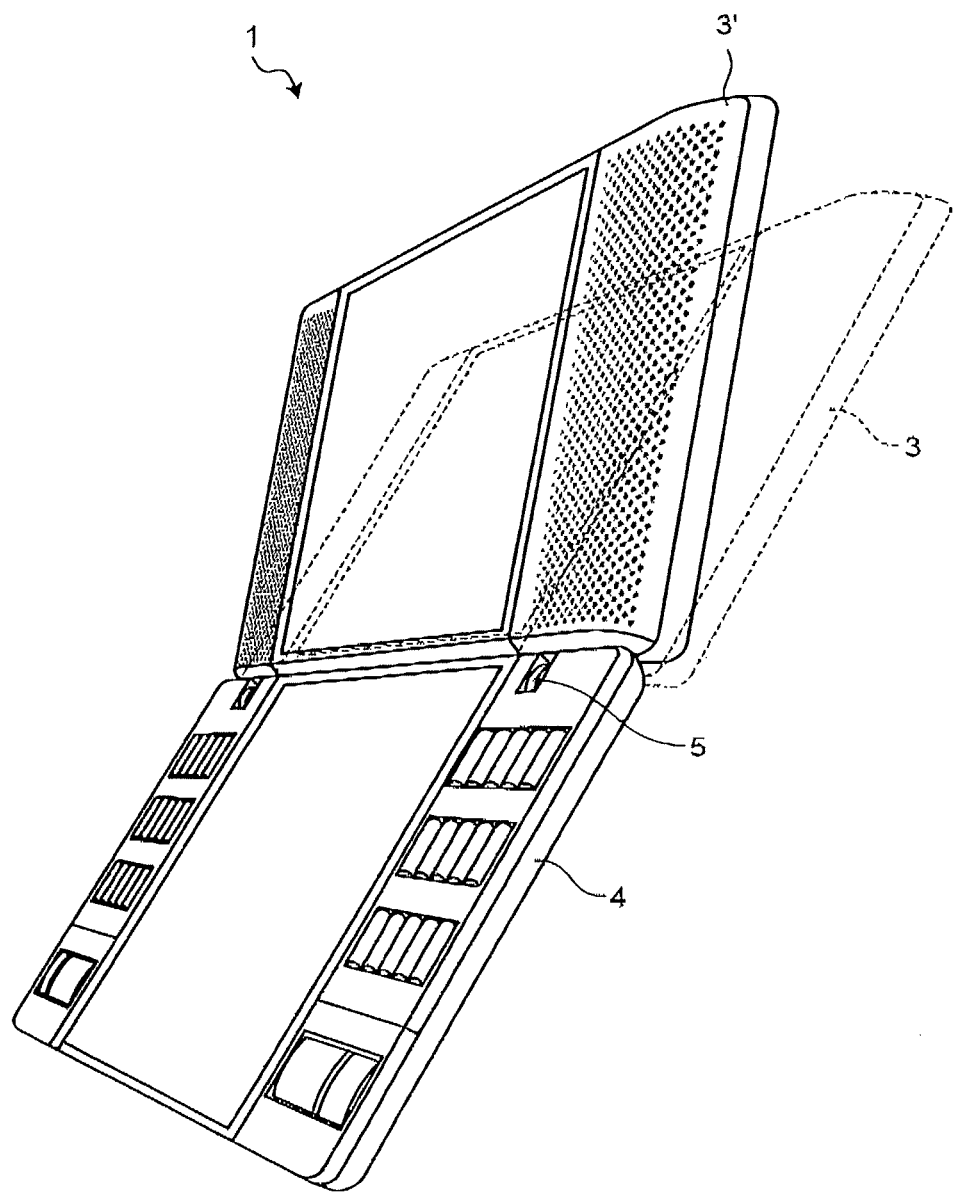
FIG. 11 is a perspective view illustrating the operation of the portable electronic apparatus.

FIG. 11 is a perspective view illustrating the operation of the portable electronic apparatus. As illustrated in FIG. 11, the portable electronic apparatus 1 is configured such that, in the opened state, the first housing 3 with respect to the second housing 4 can be supported even at the position of the first housing 3' (in this case, the front surface 3A and the front surface 4A form an angle less than 180 degrees). In this way, the angle formed between the first housing 3 and the second housing 4 can be adjusted around the axis parallel to the longitudinal direction of the front surfaces 3A and 4A in the opened state. Therefore, an image may be displayed at a more visible angle for the user.

Figure 12A:
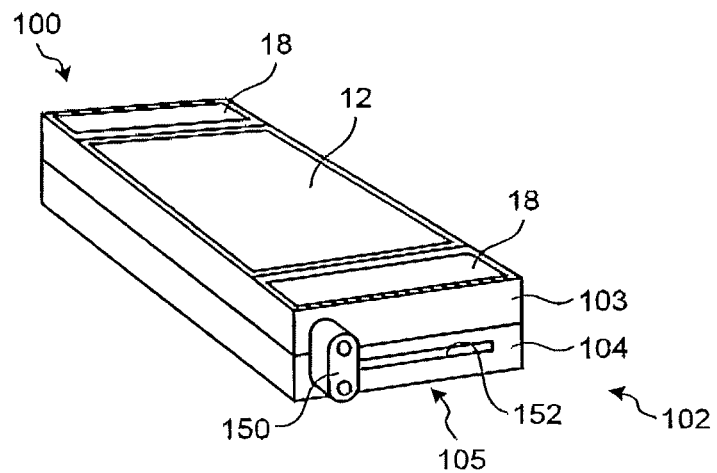
FIG. 12A is a perspective view illustrating a portable electronic apparatus according to another embodiment.
Figure 12B:
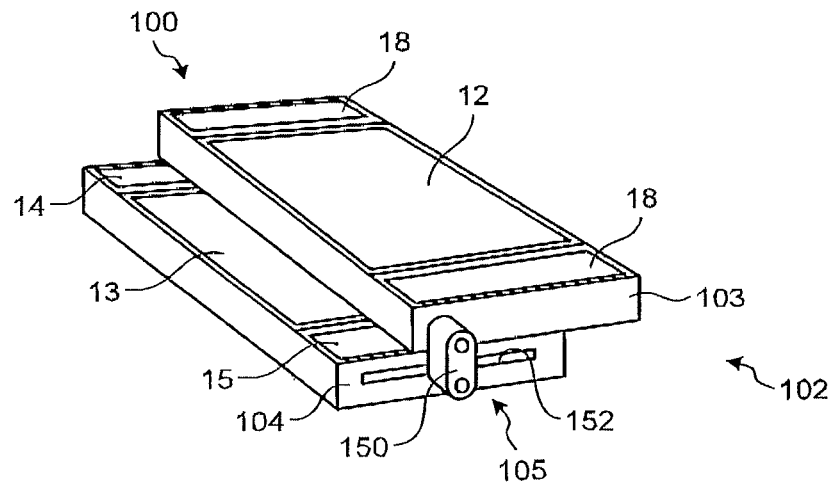
FIG. 12B is a perspective view illustrating the portable electronic apparatus illustrated in FIG. 12A in another state.
Figure 12C:
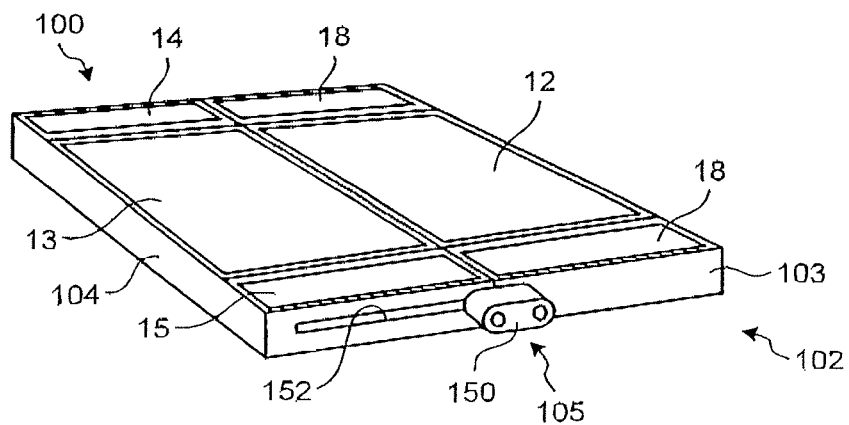
FIG. 12C is a perspective view illustrating the portable electronic apparatus illustrated in FIG. 12A in still another state.

Next, a connection mechanism for connecting a first housing and a second housing according to another embodiment will be described with reference to FIGS. 12A to 12C. FIG. 12A is a perspective view illustrating a portable electronic apparatus according to another embodiment, FIG. 12B is a perspective view illustrating the portable electronic apparatus illustrated in FIG. 12A in another state, and FIG. 12C is a perspective view illustrating the portable electronic apparatus illustrated in FIG. 12A in still another state. The portable electronic apparatus 100 illustrated in FIGS. 12A to 12C is configured with a housing 102 which includes a first housing 103, a second housing 104, and a connection mechanism 105. The first housing 103 and the second housing 104 have the same structure as the first housing 3 and the second housing 4, respectively. The first touch panel 12 and two speakers 18 are arranged in the front surface of the first housing 103. The second touch panel 13, the first operation section 14, and the second operation section 15 are arranged in the front surface of the second housing 104. As described above, the microphone and the receiver are also arranged.

The connection mechanism 105 is configured with an engagement member 150 and a groove 152. The engagement member 150 is configured such that one end portion thereof is supported by the end portion in the lateral direction of the short side surface of the first housing 103 so as to freely rotate.

The other end portion of the engagement member 150 is inserted into the groove 152, which is formed in the short side surface of the second housing 104, in a movable manner. The groove 152 is formed in the short side surface of the second housing 104, extending in the lateral direction of the front surface of the second housing 104. With the structure of the housing 102 as described above, the first housing 103 and the second housing 104 in the closed state as illustrated in FIG. 12A can move relatively to each other in the lateral (short side) direction of the front surface of the first housing 103 as illustrated in FIG. 12B. Then, after the first housing 103 and the second housing 104 relatively has moved to positions where the rear surface of the first housing 103 and the front surface of the second housing 104 do not overlap, the engagement member 150 is rotated, Therefore, as illustrated in FIG. 12C, the front surface of the first housing 103 and the front surface of the second housing 104 are in the opened state in which both the front surfaces are arranged almost on the same plane.

As described above, with the structure of the housing 102 having the connection mechanism 105 such as the portable electronic apparatus 100, the same effect described above can be obtained by providing the first operation section 14 and the second operation section 15 at both ends of the second touch panel 13.

In this case, the portable electronic apparatus is configured such that, as in the above-described embodiment, the first housing and the second housing move relatively to each other in the lateral direction of the front surface of the first housing. With this configuration, the two touch panels are combined in the opened state, so that an aspect ratio can be further reduced. The two touch panels are arranged such that the long sides thereof are parallel to the longitudinal direction of the front surfaces of the first housing and the second housing. With this configuration, when the two touch panels are linked to each other in the opened state, the long sides thereof are adjacent to each other and the two touch panels are combined, thereby reducing the aspect ratio. In other words, it is possible to form a large-scale screen with high visibility.

As described in the embodiments, the portable electronic apparatus is configured such that, in the opened state where the two displays are adjacent to each other, the image displaying surface of the first housing and the image displaying surface of the second housing are arranged on the same plane, that is, they become approximately flush with each other. In other words, the side surface of the first housing faces the side surface of the second housing in the opened state. With this configuration, when an image is displayed in the two displays (the touch panels), the boundaries of the two displays can be brought in proximity to each other, thereby displaying an image without a sense of incompatibility.

In the embodiments, the portable electronic apparatus is configured such that the side surface of the first housing faces the side surface of the second housing in the opened state, however the invention is not limited thereto. The portable electronic apparatus may be configured such that, in the opened state, the image displaying surface of the first housing and the image displaying surface of the second housing are arranged in a stepped manner. For example, the portable electronic apparatus may be configured such that, in the opened state, a part of the rear surface (the surface opposite to the surface provided with the display therein) of the first housing faces the front surface (the surface provided with the display therein) of the second housing in an overlapped manner. The portable electronic apparatus may be configured such that the first housing is separated from the second housing. In other words, as the connection mechanism, a connection mechanism may be employed with which at least one of the first housing and the second housing is connected in a removable manner.

In the embodiments, the touch panel is provided in the second housing, however the display of the second housing may serve as a display which has no functions of the operation unit. In other words, a display with no touch sensor may be employed as the display of the second housing.

The advantages are that one embodiment of the invention provides a portable electronic apparatus advantageous in operability and convenient to be held by hand.

What is claimed is:

1. A portable electronic apparatus comprising:
   a first housing;
   a second housing;
   a touch panel arranged in a first surface of the first housing;
   a display arranged in a second surface of the second housing;
   a connection mechanism for connecting the first housing and the second housing so as to switch between a closed state where the first housing covers the display and the touch panel is exposed to the outside and an opened state where the touch panel and the display are exposed to the outside while being adjacent to each other;
   an operation unit arranged on the second surface at a position adjacent to the display; and
   a control unit for controlling an operation of each unit, wherein the operation unit includes a first operation section arranged adjacent to a first side of the display and a second operation section arranged adjacent to a second side of the display opposite to the first side;
   the first operation section and the second operation section respectively include a plurality of physical keys;
   a first speaker arranged in an area that overlaps the first operation section of the first housing in the closed state; and
   a second speaker arranged in an area that overlaps the second operation section of the first housing in the closed state, and wherein
   the control unit is configured to cause the first speaker to make an operation sound when the first operation section is operated, and to cause the second speaker to make an operation sound when the second operation section is operated.

2. The portable electronic apparatus according to claim 1, wherein
   the touch panel has an image display area of a rectangular shape,
   the display has a rectangular shape whose longitudinal side is arranged parallel to a longitudinal side of the image display area, and
   the connection mechanism is configured to allow the first housing and the second housing to move relatively to each other in a direction parallel to the short sides of the image display area and the display so as to switch between the opened state and the closed state.

3. The portable electronic apparatus according to claim 1, wherein
   the operation unit is configured such that the first operation section includes a part of keys of a keyboard, and the second operation section includes the rest of the keys of the keyboard.

4. The portable electronic apparatus according to claim 3, wherein the keyboard is a keyboard having a QWERTY layout.

5. The portable electronic apparatus according to claim 1, wherein the first operation section includes a key for switching between a first input mode and a second input mode, and the second operation section includes keys configured to be used as a key in a 10-key layout in the first input mode and to be used as a key in another layout in the second input mode.

6. The portable electronic apparatus according to claim 1, wherein the first operation section and the second operation section respectively include backlight units that emit light to the plurality of keys from the inside, and the control unit is configured to cause the backlight unit to emit light to the plurality of keys arranged in the first operation section when an input operation on the first operation section is effective, and to cause the backlight unit to emit light to the plurality of keys arranged in the second operation section when an input operation on the second operation section is effective.

7. The portable electronic apparatus according to claim 1, wherein the control unit is configured to cause the touch panel to display an image representing the operation unit when the control unit detects an input operation of the touch panel in the closed state.

8. The portable electronic apparatus according to claim 1, wherein the display is a touch panel.

9. The portable electronic apparatus according to claim 1, wherein the first housing includes a first side surface having a given inclination angle, the second housing includes a second side surface having a given inclination angle, and the connection mechanism is configured to make the first side surface and the second side surface face each other in the opened state.

10. The portable electronic apparatus according to claim 1, wherein the first housing includes a concave portion in a surface, the connection mechanism includes a plate-shaped member for connecting the first housing and the second housing, and the plate-shaped member is configured to be substantially hidden in the concave portion both in the opened state and the closed state.

* * * * *